United States Patent
Williams et al.

(10) Patent No.: US 7,301,144 B2
(45) Date of Patent: Nov. 27, 2007

(54) METHOD AND SYSTEM FOR CALIBRATING A POSITRON EMISSION TOMOGRAPHY SYSTEM

(75) Inventors: John Jay Williams, Hartland, WI (US); Alexander Ganin, Whitefish Bay, WI (US); Charles William Stearns, New Berlin, WI (US); Yiping Shao, Clifton Park, NY (US); Floribertus Philippus Martinus Heukensfeldt Jansen, Ballston Lake, NY (US); Ravindra Mohan Manjeshwar, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 11/025,233

(22) Filed: Dec. 29, 2004

(65) Prior Publication Data

US 2006/0138315 A1    Jun. 29, 2006

(51) Int. Cl.
*G01D 18/00*    (2006.01)
*G12B 13/00*    (2006.01)

(52) U.S. Cl. .................................................. 250/252.1
(58) Field of Classification Search ............ 250/252.1, 250/362, 363.05, 363.09
See application file for complete search history.

(56) References Cited

U.S. PATENT DOCUMENTS

| | | | |
|---|---|---|---|
| 6,140,650 A * | 10/2000 | Berlad | 250/363.09 |
| 6,624,422 B2 | 9/2003 | Williams et al. | |
| 7,152,785 B2 * | 12/2006 | Metz et al. | 235/380 |
| 2003/0057375 A1 * | 3/2003 | Williams et al. | 250/363.09 |

* cited by examiner

*Primary Examiner*—David Porta
*Assistant Examiner*—David S Baker
(74) *Attorney, Agent, or Firm*—The Small Patent Law Group; Dean D. Small

(57) ABSTRACT

Methods and systems for calibrating a positron emission tomography (PET) system are provided. The method includes determining at least one non-acquisition time period for the PET system. The method further includes automatically acquiring calibration data during the at least one non-acquisition time period.

21 Claims, 4 Drawing Sheets

METHOD AND SYSTEM FOR CALIBRATING A POSITRON EMISSION TOMOGRAPHY SYSTEM

BACKGROUND OF THE INVENTION

This invention relates generally to Positron Emission Tomography (PET) systems and, more particularly, to calibration of PET systems.

A PET system typically includes a PET scanner and a control unit to control the scanner. The PET scanner includes detector blocks used to detect annihilation photons. With time and usage, the PET scanner requires a number of calibration operations to ensure optimal and proper performance. The different types of calibration operations include, for example, detector gain calibration, detector mapping calibration, signal level calibration, timing delay calibration and coincidence sensitivity calibration.

Some of the known calibration operations, such as, detector gain calibration, detector mapping calibration, signal level calibration, and timing delay calibration, take about an hour, while others, such as coincidence sensitivity calibration, take 10-12 hours. The calibration operations may be performed either with a rotating pin or with a fixed source of positrons. In the case of a rotating pin, a pin with a positron-containing source is rotated along the edges of a detector in the field-of-view to generate data that is used in calibrating the PET scanner, referred to as calibration data.

Known calibration operations are carried out manually by an operator and based on a recommended schedule. The operator also may initiate the calibration operations if there is a change in the state of the scanner and the scanner is operating below its optimal performance. To assist the operator in this determination, a quality assurance procedure is often established in which some data is acquired by the scanner and analyzed to determine if the calibration state is sufficient for patient imaging.

However, this manual method is only effective in determining the state of the system when the quality assurance data is acquired, which is typically once per day before the first patient is imaged. If the state of the scanner changes during the course of the day, that change may go unnoticed unless the operator initiates the quality assurance procedure at some other time. Further, continuous advances in technology lead to an increasingly demanding nature of calibration requirement for future applications. For example, more accurate calibration is required for smaller windows for timing or energy, for example in Time of Flight (TOF) scanners. Such a level of calibration is not guaranteed by the design of the scanner.

BRIEF DESCRIPTION OF THE INVENTION

In one exemplary embodiment of the invention, a method for calibrating a positron emission tomography (PET) system is provided. The method includes determining at least one non-acquisition time period for the PET system. The method further includes automatically acquiring calibration data during the at least one non-acquisition time period.

In another exemplary embodiment of the invention, a positron emission tomography (PET) system is provided. The PET system includes a PET scanner and a controller, with the controller configured to determine non-acquisition time periods for the PET scanner. The controller is further configured to control the PET scanner to automatically acquire calibration data during the non-acquisition time periods.

DETAILED DESCRIPTION OF THE INVENTION

Various embodiments of the invention provide a method and system for automatic calibration of a Positron Emission Tomography (PET) system by acquiring calibration data during a idle time or non-acquisition time period of the PET system.

Figure 1:
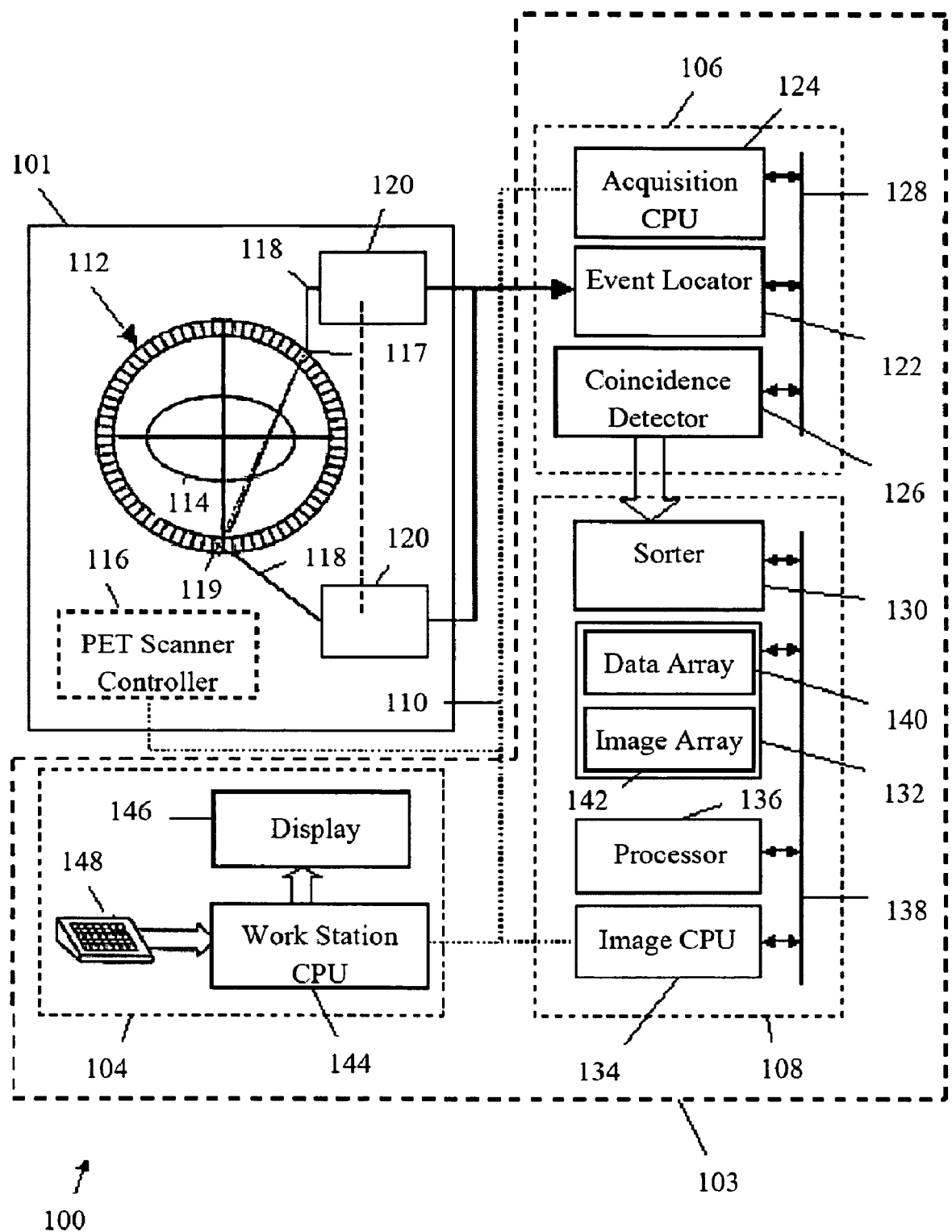
FIG. 1 is a block diagram illustrating a Positron Emission Tomography (PET) system in accordance with an exemplary embodiment of the invention.

FIG. 1 is a block diagram of an exemplary embodiment of a PET system 100 in which various embodiments of the invention may be implemented. PET system 100 includes a PET scanner 101 and a controller 103 to control the normalization and image reconstruction processes. Controller 103 is configured to determine time periods during which image data acquisition for PET scanner 101 does not occur (hereinafter referred to as non-acquisition time periods) as described in more detail herein. Controller 103 is also configured to control PET scanner 101 to acquire calibration data during the non-acquisition time periods for PET scanner 101. Calibration data includes, for example, data relating to detector gain, detector mapping, signal level, timing delays and coincidence sensitivity. In one exemplary embodiment of the invention, controller 103 is configured to determine whether calibration is required by PET system 100 based on the acquired calibration data. In another exemplary embodiment of the invention, controller 103 is configured to calibrate PET system 100 if required. The calibration data may be acquired incrementally over at least one non-acquisition time period. Controller 103 is also configured to correct losses in a normalization process due to dead time in the detector blocks of PET scanner 101. The correction is performed using the various embodiments described herein.

Controller 103 includes an operator workstation 104, a data acquisition processor 106 and an image reconstruction processor 108. PET scanner 101, operator workstation 104, data acquisition processor 106 and image reconstruction processor 108 are interconnected via a communication link 110 (e.g., a serial communication or wireless link). PET scanner 101, also referred to as a gantry, acquires scan data and transmits the data to data acquisition processor 106. The operation of PET scanner 101 is controlled from operator workstation 104. The data acquired by data acquisition processor 106 is reconstructed using a reconstruction processor 108. In one exemplary embodiment of the invention, PET scanner 101 is a time-of-flight PET scanner.

PET scanner 101 may operate using, for example, a plurality of detector rings. One such detector ring, detector ring 112, is illustrated in FIG. 1. Detector ring 112 includes a central opening, in which a patient 114 may be positioned, using, for example, a motorized table, that is aligned with the central axis of detector ring 112. This motorized table moves patient 114 into the central opening of detector ring 112 in response to one or more commands received from operator workstation 104. A PET scanner controller 116, also referred to as the gantry controller, is provided within PET scanner 101. PET scanner controller 116 responds to the commands received from operator workstation 104 through communication link 110. Therefore, the operation of PET scanner 101 is controlled from operator workstation 104 through PET scanner controller 116.

The detection system, including detector ring 112, is divided into multiple detection units. Each of these units is provided with electronics to process single events as needed for the rapid detection of events in coincidence image collection. To complement the capability of this unit level electronics, memory is provided at each unit to collect calibration data. These units may be switched from calibration to image collection mode very rapidly. The calibration data collected in the memory can then be slowly read out or output for analysis without time critical constraints. Such parallel detection is also described in U.S. Pat. No. 6,624,422, entitled "Method For Dynamic Stabilization of PET Detector Gains", the entire disclosure of which is hereby incorporated by reference herein.

Detector ring 112 includes a plurality of detector blocks (e.g., in the GE Discovery™ ST PET, a diagnostic imaging system by GE Medical Systems, there are 420 crystals per ring, and 24 rings in the scanner). For example, detector ring 112 includes a detector block 117, a detector block 119, and several other detectors. Detector block 117, like the other detector blocks, includes a set of scintillator crystals arranged in a matrix that is disposed in front of a plurality of photomultiplier tubes (e.g., four tubes). When a photon collides with a crystal on a detector block, it produces scintillation within the crystal. Each photomultiplier tube produces an analog signal on communication line 118 when a scintillation event occurs. A set of acquisition circuits 120 is provided within PET scanner 101 to receive these analog signals. Acquisition circuits 120 produce digital signals indicating the 2-dimensional (2D) location of the event in the block where acquisition takes place, and total energy of the event. Acquisition circuits 120 also produce an event detection pulse, which indicates the time or moment the scintillation event occurred. These digital signals are transmitted through a communication link, for example, a cable, to an event locator circuit 122 in data acquisition processor 106.

Data acquisition processor 106 includes event locator 122, an acquisition CPU 124 and a coincidence detector 126. Data acquisition processor 106 periodically samples the signals produced by acquisition circuits 120. Acquisition CPU 124 controls communications on a back-plane bus 128 and on communication link 110. Event locator circuit 122 processes the information regarding each valid event, and provides a set of digital numbers or values indicative of the detected event. For example, this information indicates when the event took place and the position of the scintillation crystal that detected the event. An event data packet is communicated to coincidence detector 126 through back-plane bus 128. Coincidence detector 126 receives the event data packets from event locator circuit 122 and determines if any two of the detected events are in coincidence. Coincidence is determined by a number of factors. First, the time markers in each event data packet must be within a predetermined time period, for example, 6 nanoseconds, of each other. Second, the LOR formed by a straight line joining the two detector blocks that detect the coincidence event should pass through the field of view in PET scanner 101. Events that cannot be paired are discarded. Coincident event pairs are located and recorded as a coincidence data packet that is conveyed through a communication link to a sorter 130 in image reconstruction processor 108.

Image reconstruction processor 108 includes sorter 130, a memory module 132, an image CPU 134, an array processor 136 and a back-plane bus 138. Sorter 130 counts all events occurring along each projection ray and organizes them into 3D data. This 3D data (or sinograms) is organized in one exemplary embodiment as a data array 140. Data array 140 is stored in memory module 132. Back-plane bus 138 is linked to communication link 110 through Image CPU 134. Image CPU 134 controls communication through back-plane bus 138. Array processor 136 is also connected to back-plane bus 138. Array processor 136 receives data array 140 as an input and reconstructs images in the form of image arrays 142. Resulting image arrays 142 are stored in memory module 132.

The images stored in image array 142 are communicated by image CPU 134 to operator workstation 104. Operator workstation 104 includes a CPU 144, a display device 146 and an input device 148. CPU 144 connects to communication link 110 and receives inputs (e.g., user commands) from input device 148. Input device 148 may be, for example, a keyboard, mouse, or a touch-screen panel. Through input device 148 and associated control panel switches, the operator can control the calibration of PET scanner 101, the configuration of PET scanner 101, and the positioning of patient 114 for a scan. Similarly, the operator can control the display of the resulting image on display device 146 and perform image-enhancement functions using programs executed by workstation CPU 144.

Figure 2:
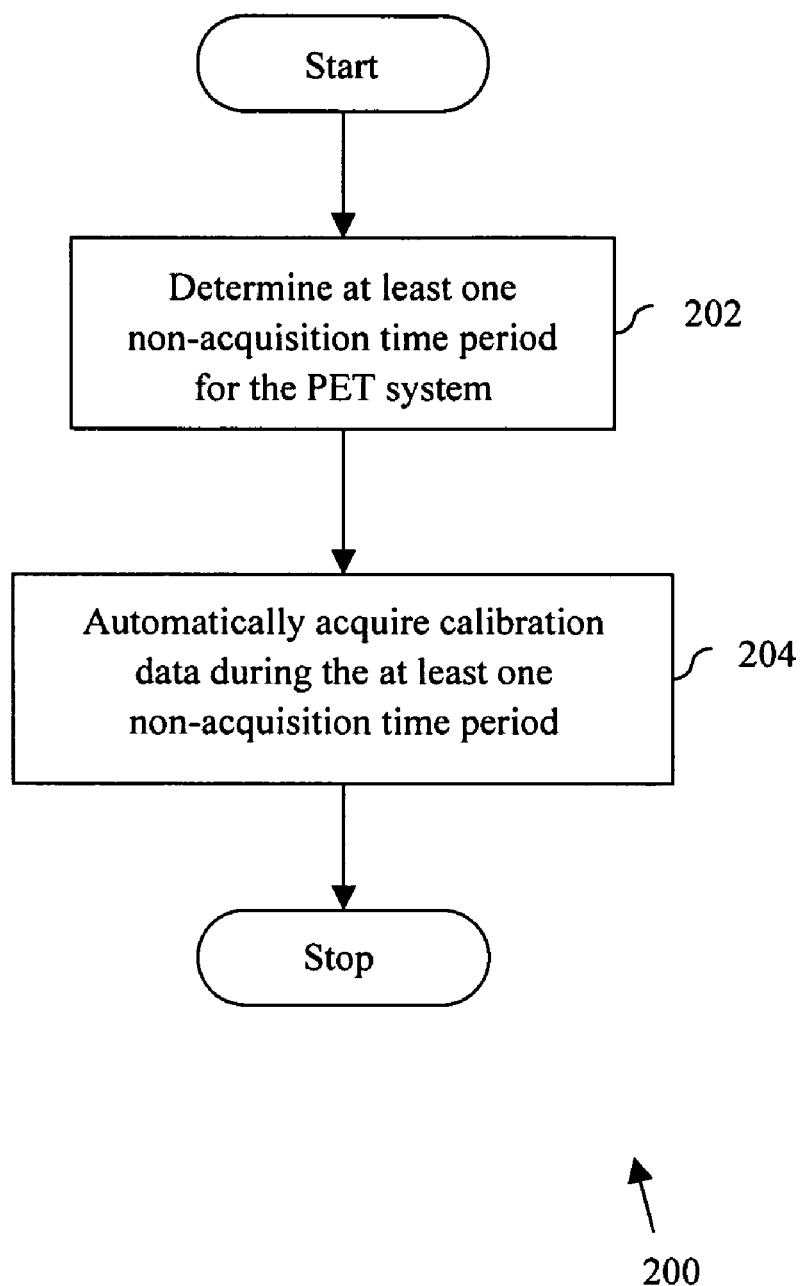
FIG. 2 is a flowchart illustrating a method for automatic calibration of a PET system in accordance with an exemplary embodiment of the invention.

FIG. 2 is a flowchart illustrating a method 200 for automatic calibration of PET system 100 (shown in FIG. 1) in accordance with an exemplary embodiment of the invention. At 202, at least one non-acquisition or idle time period for PET system 100 is determined. In one exemplary embodiment of the invention, the non-acquisition time period for PET system 100 is determined automatically. In another exemplary embodiment of the invention, the non-acquisition time period for PET system 100 is determined periodically. The period of non-acquisition time period may be, for example, the time period between two patient examinations. At 204, calibration data is automatically acquired during the at least one non-acquisition time period. The process for determining non-acquisition time periods and acquiring calibration information are described in more detail below in connection with FIG. 4. Further, in various embodiments, at least some portion of the calibrations (specifically timing calibration) is verified and, if needed, updated during the acquisition time period for PET system 100.

Figure 3:
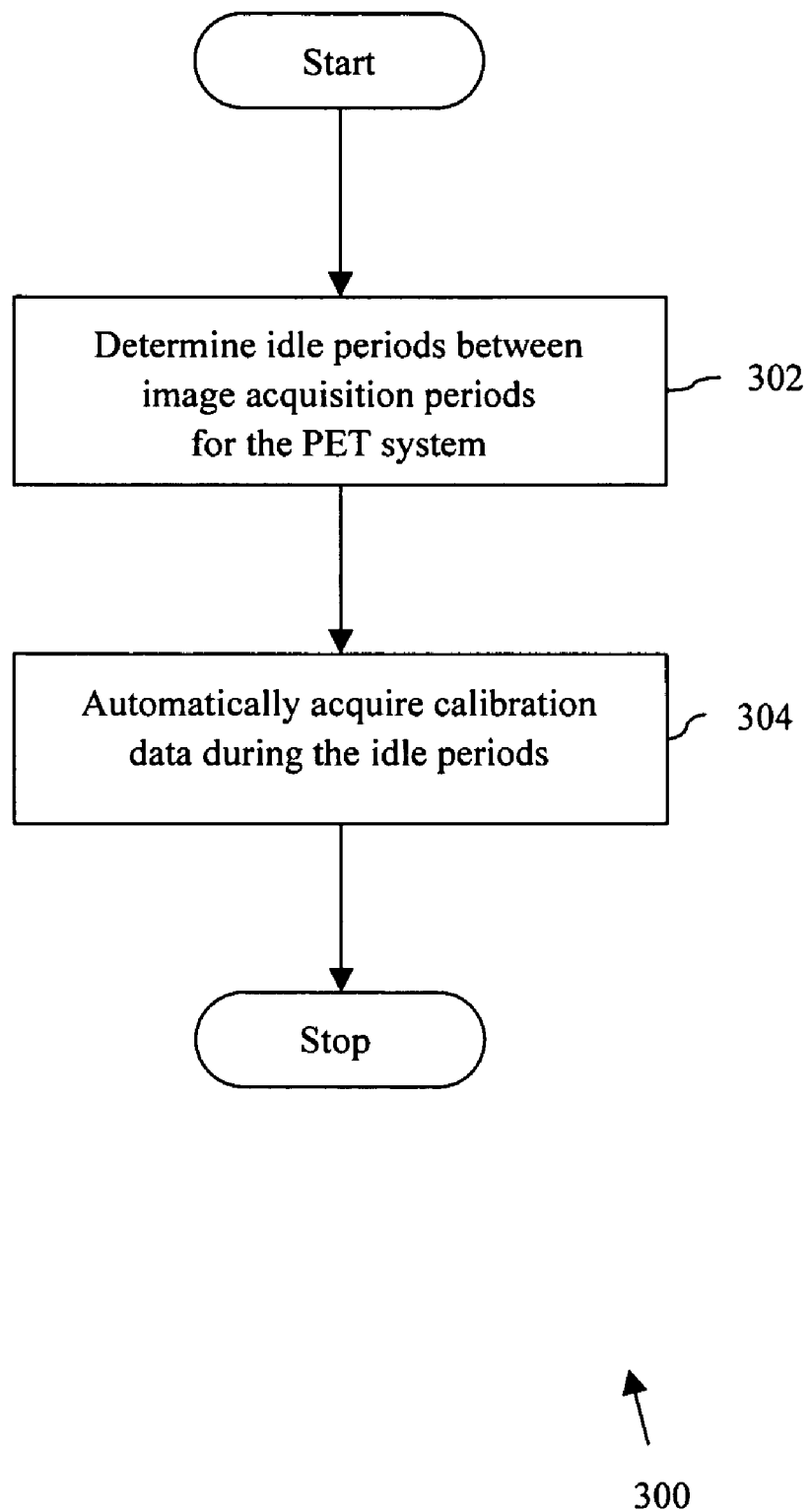
FIG. 3 is a flowchart illustrating a method for automatic calibration of a PET system in accordance with an exemplary embodiment of the invention.

FIG. 3 is a flowchart illustrating a method 300 for automatic calibration of PET system 100 (shown in FIG. 1) in accordance with an exemplary embodiment of the invention. At 302, non-acquisition or idle periods between image acquisition periods for PET system 100 are determined. At 304, calibration data is automatically acquired during the idle periods. Idle periods are time periods during which image acquisition data is not collected. In one exemplary embodiment of the invention, calibration data relating to timing delay calibration may be acquired when the patient is in the detector bore of PET system 100, but image data acquisition is not occurring.

Figure 4:
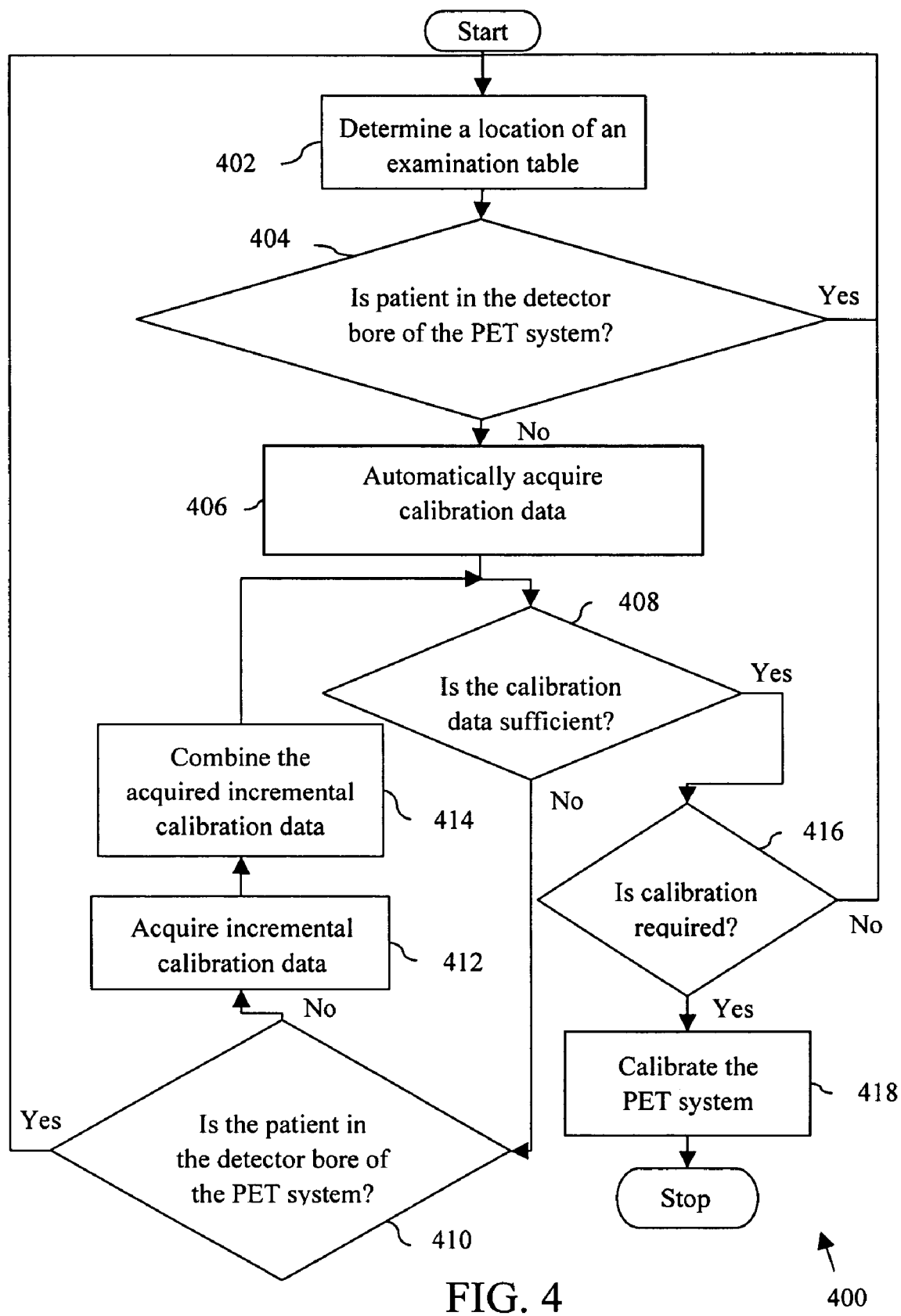
FIG. 4 is a flowchart illustrating a method for controlling and automatically calibrating a PET system in accordance with an exemplary embodiment of the invention.

FIG. 4 is a flowchart illustrating a method 400 for controlling and automatically calibrating PET system 100 (shown in FIG. 1), in accordance with an exemplary embodiment of the invention. At 402, a location of an examination table is determined by controller 103 (shown in FIG. 1). At 404, the location of the examination table determined at 402 is used to identify whether a patient is in the detector bore of PET system 100. If the patient is not in the detector bore of PET system, thereby indicating a non-acquisition time period, the calibration data is automatically acquired at 406. In various known implementations of CT/PET imaging systems, the examination table is positioned separately for CT and PET imaging. As a result of this separation, the system can determine the location of the examination table and the intended acquisition. Thus, a non-acquisition time can be detected based on the location of the examination table. Alternatively, in various embodiments, it is possible that the examination table is inside the bore, but it is still safe to acquire calibration data. Some exemplary methods to determine that it is safe to acquire calibration data are hereinafter described. In an embodiment, a sensor in the examination table detects that no patient is on the examination table. In this case, the position of the examination table is irrelevant. The sensor may detect load on the table to establish the presence of a patient on the table. Alternatively, the sensor may be an optical sensor, wherein the sensor detects a break in an optical path due to the presence of a patient on the examination table. In another embodiment, the sensor may be a camera that can identify an empty examination table based on previous learning of the view of an empty examination table using, for example, a neural network. Alternatively, in another embodiment, the drapes on the examination table or the examination table surface may have a specific color, the detection of which indicates that the examination table is empty.

In certain situations it may be possible to acquire calibration data not only with the patient on the table, but actually using the patient emission as the source of the calibration radiation.

Further, in various embodiments, the separation of the location of the examination table may not be maintained for the functioning of the scanner. In such cases, a non-acquisition time period may be determined by the location of the examination table relative to the detector bore to detect if a patient is present in the detector bore.

If the patient is in the detector bore of PET system 100, calibration data is not acquired until the patient is moved out of the detector bore. At 408, a determination is made as to whether the acquired calibration data is sufficient to evaluate the performance of the PET system 100 (e.g., providing acceptable image quality). If the calibration data acquired at 406 is not sufficient, another determination is made at 410 as to whether the patient is in the detector bore of PET system 100. If the patient is not in the detector bore of PET system 100, incremental calibration data is acquired at 412 during a plurality of determined non-acquisition time periods. The incremental calibration data is combined at 414 and a determination for data sufficiency, at 408 is repeated. If the patient is in the detector bore of PET system 100, method 400 is repeated. If the calibration data acquired at 406 is sufficient, a determination is made at 416, based on the acquired data, whether it is necessary to calibrate PET system 100. If calibration is not required, new data is collected and method 400 is repeated. If calibration is required, as determined from the calibration data acquired at 414, PET system 100 is calibrated at 418 as is known.

The calibration data acquired for calibrating PET system 100 includes data relating to at least one of the calibration operations, such as, detector gain, detector mapping, signal level, timing delays and coincidence sensitivity. The detector gain, detector mapping, and signal level calibration data is based on the signal detected from a single 511 keV photon. The calibrations are based on the collection of histograms of events based either on event size (in the case of detector gain and signal level calibration) or event position (in the case of detector mapping). Because of the statistical nature of these measurements, many samples are obtained and combined into a histogram so that the mean values can be used to determine the required calibration. Timing and coincidence sensitivity calibration is based on measurements made with the pair of photons from positron annihilation. Even in this case, the calibration calculation is made based on histogram data to have sufficient samples for a valid mean.

The calibration data is automatically acquired for each of a plurality of detector blocks of PET system 100. In one exemplary embodiment of the invention, automatic acquisition of calibration data includes obtaining calibration data for each of a plurality of calibration operations in a round robin process. In another exemplary embodiment of the invention, automatic acquisition of calibration data includes obtaining calibration data for each of a plurality of calibration operations in a sequential order. In yet another exemplary embodiment of the invention, automatic acquisition of calibration data includes obtaining calibration data for each of a plurality of calibration operations in the order of priority of the calibration operations. The calibration data is automatically acquired between scanning operations of PET system 100 as described herein. Scanning operation is performed by PET scanner 101 to acquire image data used in the reconstruction of an image. The acquisition of calibration data is terminated prior to an image data acquisition period. If the acquisition of calibration data is terminated because another patient scan was initiated and calibration data sufficient for calibration is not acquired during a non-acquisition time period, incremental calibration data is acquired over a plurality of determined non-acquisition time periods.

In one exemplary embodiment of the invention, the incremental calibration data over a plurality of non-acquisition time periods is acquired to provide a defined level of statistical significance. For example, calibration data may be acquired over 20 different time periods of 10 seconds each.

In another embodiment of the invention, incremental calibration data is combined into a single measurement over time. A method of combining these measurements is an Infinite Impulse Response (IIR) filter that uses the following equation:

$$newaverage = \frac{\text{new} + (N-1)*\text{old}}{N} \quad (1)$$

In Equation 1, additional weights are assigned to the recent samples of calibration data, which are defined by new in Equation 1. N is the weighting factor. A smaller value of N gives more weight to the recent samples. It indicates how long the effect of an earlier calibration value will last. The IIR method generates incremental updates to the calibration value. The degree to which an individual calibration acquisition changes the calibration value is inversely proportional to N. When N is 1, the calibration value changes to the most recently calculated value. As the value of N is increased, the change made in the calibration value with a single calibration acquisition becomes smaller. The value of N is chosen such that the uncertainty in the final calibration value is at an acceptable level. For example, if it is desired to have a 1% uncertainty in the calibration value, but it is known from the statistics of the most recent calibration acquisition that there is an inherent uncertainty of 10%, then 100 such acquisitions will be required (i.e., $(10\%/1\%)^2=100$) to get the required statistical uncertainty. In such a case it is required to choose N as at least 100. In various embodiments, N is calculated at each update based on the calculated uncertainty. Thus, if the time available to acquire data is more, and there is less uncertainty in the new value, a smaller value of N can be used. On the other hand, a larger value of N is used if only a short acquisition is possible or, for example, if the count rate of activity is low, resulting in relatively few events for the calculation.

Various embodiments of the invention provide a PET system that acquires calibration data during determined non-acquisition periods or idle periods without interrupting the imaging operation. Further, the various embodiments of the invention provide a PET system that combines calibration data sets with time to decrease variation in results. Further, various embodiments of the invention also provide a PET system that provides a calibration frequency of more than once a day (e.g., one per patient).

A technical effect of the various embodiments of the invention is to provide a PET system that acquires calibration data during determined non-acquisition periods without interrupting the imaging operation. Another technical effect of the various embodiments of the invention is to provide a PET system that combines calibration data sets with time to decrease variation in results. Yet another technical effect of the various embodiments of the invention is to provide a PET system that provides a calibration frequency of more than once a day.

The various embodiments or components thereof may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device can also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software.

Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for calibrating a positron emission tomography (PET) system, said method comprising:
   determining at least one non-acquisition time period for the PET system;
   automatically acquiring calibration data during the at least one non-acquisition time period; and
   determining whether to calibrate the PET system based on the acquired calibration data.

2. A method in accordance with claim 1 further comprising calibrating the PET system when a determination is made from the acquired calibration data to calibrate the PET system.

3. A method in accordance with claim 1 wherein the automatically acquiring comprises acquiring incremental calibration data during a plurality of determined non-acquisition time periods.

4. A method in accordance with claim 3 further comprising combining the acquired incremental calibration data.

5. A method in accordance with claim 1 wherein the calibration data comprises data relating to at least one of detector gain, detector mapping, signal level, timing delays and coincidence sensitivity.

6. A method in accordance with claim 1 further comprising re-calibrating the PET system based on the acquired calibration data.

7. A method in accordance with claim 1 wherein the automatic acquisition of calibration data is performed between scanning operations of the PET system.

8. A method in accordance with claim 1 wherein the automatically acquiring comprises obtaining calibration data for each of a plurality of calibration operations in a round robin process.

9. A method in accordance with claim 1 wherein the calibration data is automatically acquired for each of a plurality of detector blocks of the PET system.

10. A method in accordance with claim 1 further comprising terminating the acquisition of calibration data prior to an image data acquisition period.

11. A method in accordance with claim 1 wherein the PET system comprises a time-of-flight PET scanner.

12. A method in accordance with claim 1 wherein the determining is performed periodically.

13. A method in accordance with claim 1 wherein the determining is performed automatically.

14. A method for calibrating a positron emission tomography (PET) system, said method comprising:

determining at least one non-acquisition time period for the PET system including identifying whether a patient is in a detector bore of the PET system; and automatically acquiring calibration data during the at least one non-acquisition time period.

15. A method in accordance with claim 14 wherein the identifying comprises determining a location of an examination table to identify whether a patient is in the detector bore.

16. A method for automatic calibration of a positron emission tomography (PET) system, said method comprising:

determining idle periods between image acquisition periods for the PET system; and automatically acquiring calibration data during the idle periods.

17. A method in accordance with claim 16 further comprising determining whether to calibrate the PET system based on the acquired calibration data.

18. A method in accordance with claim 16 where in the automatically acquiring comprises obtaining incremental calibration data corresponding to at least one calibration operation.

19. A method in accordance with claim 16 wherein the calibration data comprises data relating to at least one of detector gain, detector mapping, signal level, timing delays and coincidence sensitivity.

20. A positron emission tomography (PET) system comprising:

a PET scanner; and a controller for controlling the PET scanner, the controller configured to determine non-acquisition time periods for the PET scanner, to control the PET scanner to automatically acquire calibration data during the non-acquisition time periods and to determine whether to calibrate the PET system based on the acquired calibration data.

21. A PET system in accordance with claim 20 wherein the controller is configured to control the PET scanner to acquire the calibration data incrementally during the non-acquisition time periods.

* * * * *